United States Patent [19]
Cox et al.

[11] Patent Number: 6,109,814
[45] Date of Patent: Aug. 29, 2000

[54] "FLOAT/NO-FLOAT" MECHANISM FOR 3-POINT HITCH

[75] Inventors: Teresa L. Cox, West Fargo, N. Dak.; Bryan J. Garberg, Moorhead; John T. Rasset, Barnesville, both of Minn.

[73] Assignee: Case Corporation, Racine, Wis.

[21] Appl. No.: 09/002,334

[22] Filed: Jan. 2, 1998

[51] Int. Cl.[7] ............................................. F16C 11/00
[52] U.S. Cl. ........................ 403/61; 403/91; 403/79; 172/450; 280/474
[58] Field of Search ..................... 280/497, 492, 280/474; 172/450, 439; 403/113, 116, 150, 79, 157, 84, 88, 91, 92, 61, 59

[56] References Cited

U.S. PATENT DOCUMENTS

| | | |
|---|---|---|
| 1,574,351 | 2/1926 | Atgelt . |
| 2,738,206 | 3/1956 | Loughner ............................ 280/497 X |
| 3,357,720 | 12/1967 | Kulhavy et al. . |
| 3,380,759 | 4/1968 | Engelmann . |
| 3,524,514 | 8/1970 | Kratzke ............................. 280/492 X |
| 3,910,355 | 10/1975 | Elfes et al. ........................... 172/450 |
| 4,194,757 | 3/1980 | Lucas et al. ........................... 172/439 |
| 4,862,971 | 9/1989 | Azzarello et al. ...................... 172/450 |

FOREIGN PATENT DOCUMENTS

| | | | |
|---|---|---|---|
| 210659 | 1/1960 | Germany | 172/450 |
| 1221833 | 7/1966 | Germany | 172/450 |
| 2223888 | 12/1973 | Germany | 172/450 |
| 4021884 | 10/1991 | Germany | 172/450 |
| 141922 | 9/1953 | Norway | 172/450 |

*Primary Examiner*—Harry C. Kim
*Attorney, Agent, or Firm*—Jansson, Shupe, Bridge & Munger, Ltd.

[57] ABSTRACT

An implement-positioning apparatus used on an implement-towing vehicle such as a tractor includes a draft arm, a lift link, and a mechanism coupling the arm and the link together. The mechanism selectively permits floating arm movement (and therefore floating implement movement) relative to the link. In the improvement, the mechanism includes a clevis-like attachment member fixed on the link and having two arms, each with a slot extending therealong. A pivot-mounted selection member is coupled to the attachment member by a pin through the slots and moves between a first position engaging the attachment member and a second position away from the attachment member. When the selection member is in the second position, the pin is free to move along the slots and thereby permit the draft arm and the implement coupled thereto to "float" and, within limits set by the length of the slots, seek its own elevation under the urging of external forces.

13 Claims, 6 Drawing Sheets

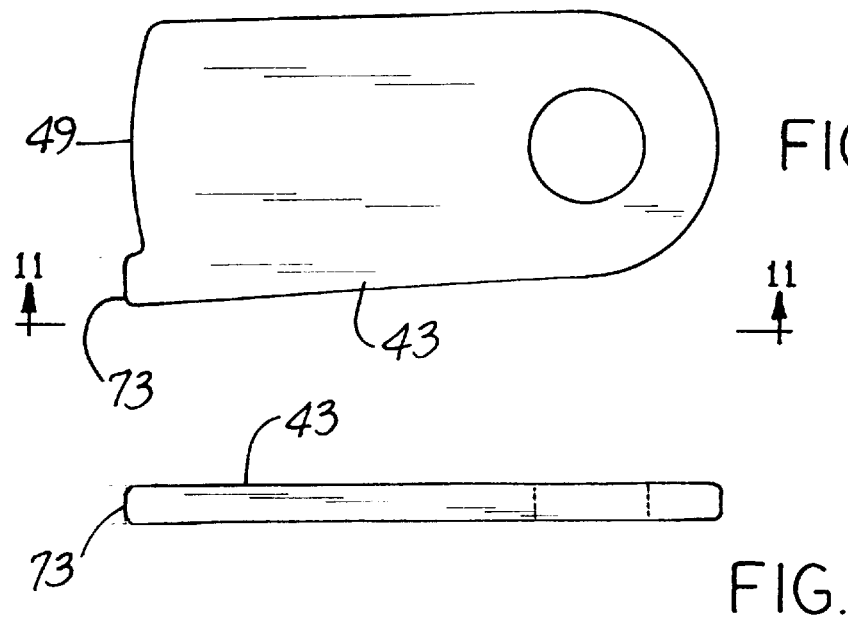
FIG. 10
FIG. 11
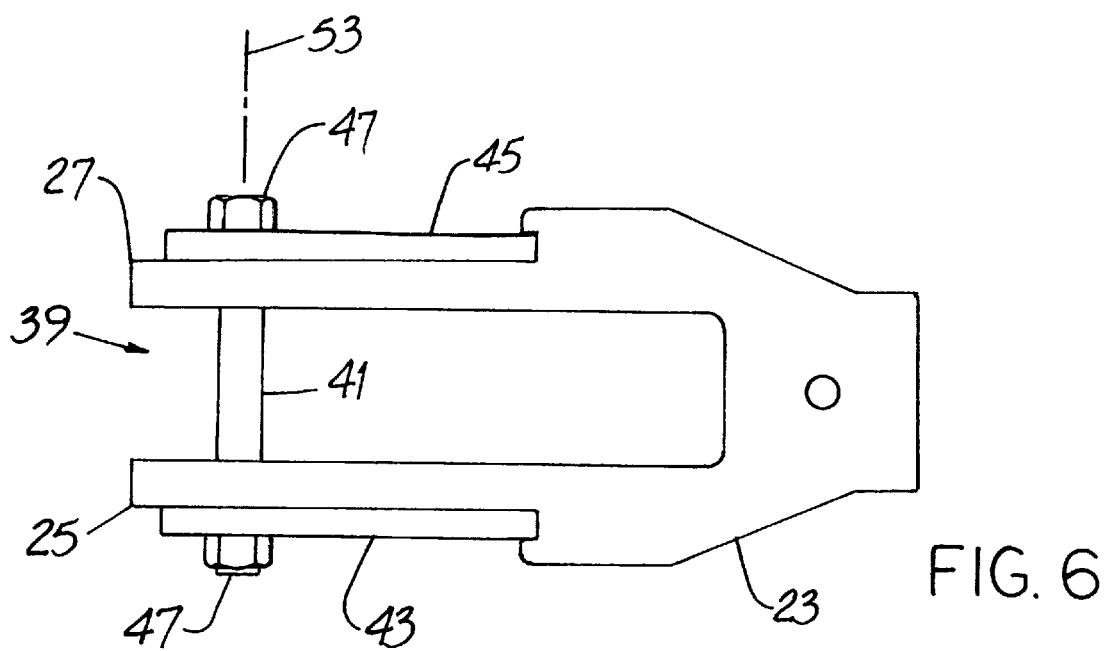
FIG. 6

# "FLOAT/NO-FLOAT" MECHANISM FOR 3-POINT HITCH

FIELD OF THE INVENTION

This invention relates to land vehicles and, more specifically, to draft control of agricultural implements attached to a tractor by a 3-point hitch.

BACKGROUND OF THE INVENTION

Towed agricultural implements, e.g., plows and the like, are attached to a tractor using what is known as a 3-point hitch. The hitch has a pair of laterally-spaced draft arms which can be raised and lowered to vary the height of the implement with respect to the surface of the ground. A third arm (sometimes referred to as an upper link or a center link) is above and laterally midway between the draft arms. Like the draft arms, the third arm also has an eye to attach to the implement being towed.

There are several reasons why it is desirable to be able to vary implement height and to hold the selected height, notwithstanding external, ground-imposed forces which may act on the implement. As an example, when a field is being tilled, it is preferred that the tillage implement engage the ground to the same depth for each "pass" of the implement through the field and to the same depth with respect to the entirety of any particular pass. And a field is often prepared to have a tilled portion for crop growing and non-tilled "headlands" at either of two opposed field boundaries. The headlands, covered with weeds, grass or the like, are usually at a somewhat higher elevation than the tilled portion. When the tractor and implement reach the end of a pass at a headland, the implement is raised to "clear" such headland while the tractor is making a U-turn into the next pass.

It is apparent from the foregoing that a characteristic of a conventional 3-point hitch is that once the vertical position of the hitch draft arms (and of the implement attached to the draft arms) is established, such position cannot be modified except by changing the vertical position of the draft arms. But workers in this area of technology have long recognized that there are times when it is desirable to let the implement "float," i.e., to seek its own elevation (within limits) under the urging of external forces as the implement is towed along and without moving the position of the lift links. And as the corollary, there are other times (in fact, most of the time) when it is desirable to prevent the implement from moving vertically except by controlling the height of the draft arms conventionally by moving the lift links.

For example, U.S. Pat. No. 3,380,759 (Engelmann) discloses a tractor draft arm support that has a link, one end of which is pivotally pinned to a draft arm. A midpoint of the link is pivotally pinned to a bifurcated support. In the "no-float" configuration, a rotatable lock pin engages the other end of the link and prevents link pivoting. In the float position, the lock pin is disengaged from such other end and the link is free to pivot about the midpoint pin. The draft arm is therefore free to move a limited distance and direction without moving the draft arm support.

U.S. Pat. No. 3,357,720 (Kulhavy et al.) discloses an apparatus which permits or prevents vertical float and horizontal sway. Vertical float is permitted or prevented by the position of a locking tongue with respect to an arm. The locking tongue slides into (no-float) or out of (float) engagement with such arm.

U.S. Pat. No. 1,574,351 (Altgelt) discloses a draft device having a draft member pinned to a coupling having diverging opposed sides. When a blocking pin is in place, the draft member is prevented from pivoting with respect to the coupling. But when the blocking pin is removed, the draft member is free to pivot within limits established by the diverging opposed sides. It is fair to say that the Altgelt device is not well suited for use with a modern 3-point hitch.

While these earlier devices have been (or were) generally suitable for the intended use, they are not without disadvantages. For example, the Engelmann, Kulhavy et al. and Altgelt devices all permit free pivoting movement but do not permit linear movement. And the Kulhavy et al. apparatus has a significant number of parts and some of those parts are, seemingly, closely-fitted to one another. A multiplicity of parts has adverse implications for cost and purchase price and, very possibly, for reliability. And closely-fitted parts are seemingly not well advised for use in applications (like implement towing) where dust, dirt, grime and water are common.

A new implement-positioning apparatus with improved float/no-float mechanism would be an important advance in the art.

OBJECTS OF THE INVENTION

It is an object of the invention to provide an implement-positioning apparatus with improved float/no-float mechanism that addresses some of the problems and shortcomings of the prior art.

Another object of the invention is to provide such a mechanism which is suitable for use with a modern 3-point hitch.

Another object of the invention is to provide such a mechanism which permits linear movement of mechanism components relative to one another.

Still another object of the invention is to provide such a mechanism which has relatively-few parts.

Another object of the invention is to provide such a mechanism which is sufficiently robust to withstand the rigors of tillage service. How these and other objects are accomplished will become apparent from the following descriptions and from the drawings.

SUMMARY OF THE INVENTION

The invention involves an improvement in an implement-positioning apparatus of the type having a draft arm, a lift link extending along a long axis, and a mechanism coupling the arm and the link together. Depending upon how the mechanism is "set," it prevents or permits floating draft arm movement relative to the link.

In the improvement, the mechanism includes a clevis-like attachment member fixed with respect to the link and having first and second spaced-apart arms, each having an elongate slot formed in it. The arms and the slots extend generally parallel to the link long axis.

A selection member has first and second spaced-apart, parallel plates coupled to the attachment member by a pin through the slots. The selection member pivotally moves between a first position engaging the attachment member and a second position away from the attachment member.

When the selection member is set in its first position, its plates are parallel to the arms and each of its plates engages a respective contoured surface on each of the arms and holds the pin at the distal ends of the slots. That is, the pin is prevented from moving along the slots and, therefore, the draft arm (through which the pin also extends) is prevented from moving up and down with respect to the lift link. The mechanism is then said to be set in the no-float configuration. In a highly preferred embodiment, each plate of the selection member has a proximal end shaped like the attachment member contoured surface engaged by such proximal end.

In another aspect of the invention, the contoured surface formed on each arm of the attachment member has a radius of curvature. The pin has a long axis and when the selection member is in its first or no-float position, the long axis is spaced from the contoured surfaces by a first dimension substantially equal to the radius of curvature.

When the selection member is in the second position, its plates are pivoted away from the arms of the attachment member. The mechanism is then said to be in the float configuration. The pin, no longer held at the slot distal ends by the selection member engaging the attachment member, is then free to move along the slots. Such movement will occur when the implement attached to the draft arm passes over a bump or depression and urges the draft arm up or down. And when the pin moves away from the slot distal ends under the urging of forces acting on the towed implement, the pin long axis is spaced from the contoured surfaces of the attachment member by a second dimension less than the radius of curvature.

Because agricultural implements and the tractors which tow them are subject to a good deal of rough use, a highly preferred embodiment of the mechanism also includes a retention structure for securing the selection member in the first position. A specific retention structure includes first and second tangs extending respectively from the first and second plates of the selection member. First and second resilient retaining devices, e.g., springy wire loops or the like, overlap the first and second tangs, respectively, when the selection member is in its first position.

More specifically, when the plates are in the first position, each tang is are between its respective retaining device and the attachment member. When the plates are in the second position, each retaining device also holds its respective plate away from the respective contoured surface formed in an arm of the attachment member. When the plates are in such second position, the retaining devices are between their respective tangs and the attachment member.

Other details of the invention are set forth in the following detailed description and in the drawings.

BRIEF DESCRIPTION OF THE DRAWINGS

FIG. 6 is a bottom plan view of the attachment member of FIG. 3 shown in conjunction with another component of the new mechanism, the selection member.

FIG. 10 is an elevation view, inverted with respect to the views of FIGS. 12 and 13, of still another component of the new mechanism, a plate.

FIG. 11 is a view of the plate of FIG. 10 taken along the viewing plane 11—11 thereof. Surfaces of the opening are shown in dashed outline.

DETAILED DESCRIPTIONS OF PREFERRED EMBODIMENTS

Figure 2:
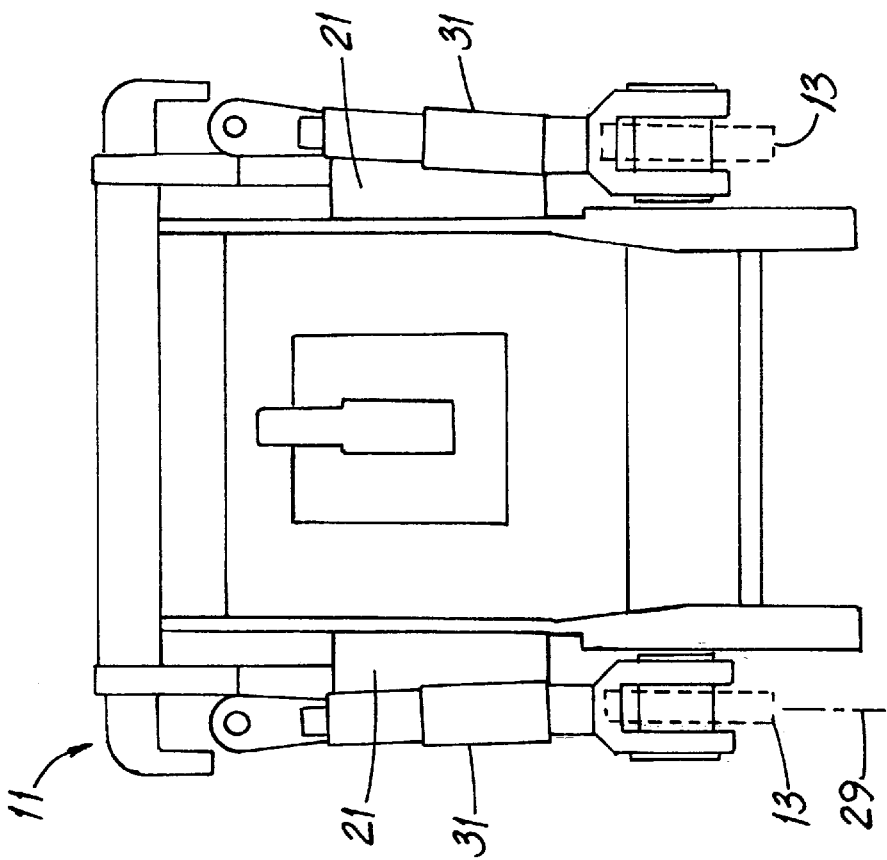
FIG. 2 is a forward-looking elevation view of the 3-point hitch of FIG. 1 taken along the viewing axis VA1 thereof.
Figure 1:
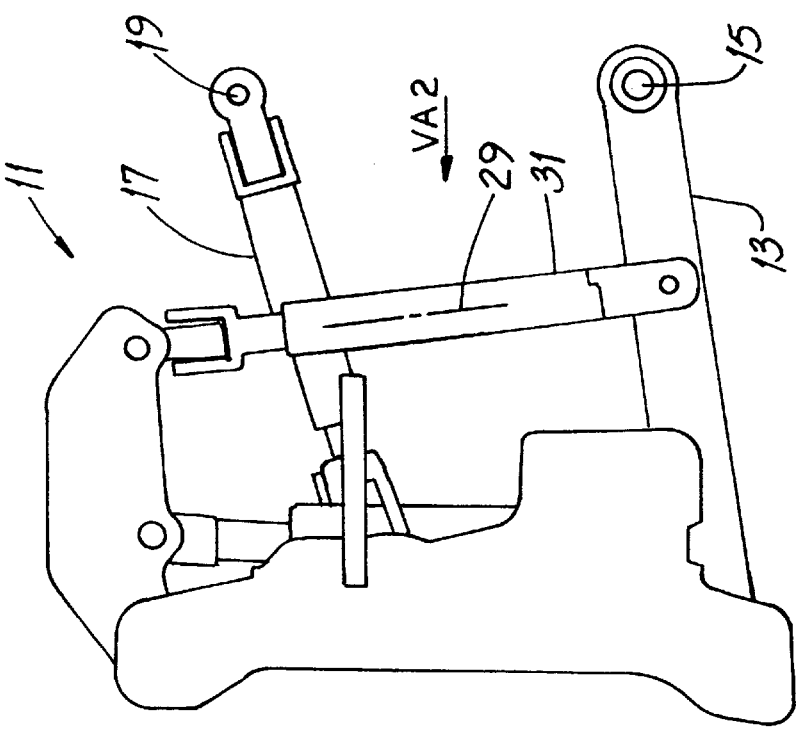
FIG. 1 is a representative side elevation view of a tractor 3-point hitch of the type with which the new mechanism is used.
Figure 3:
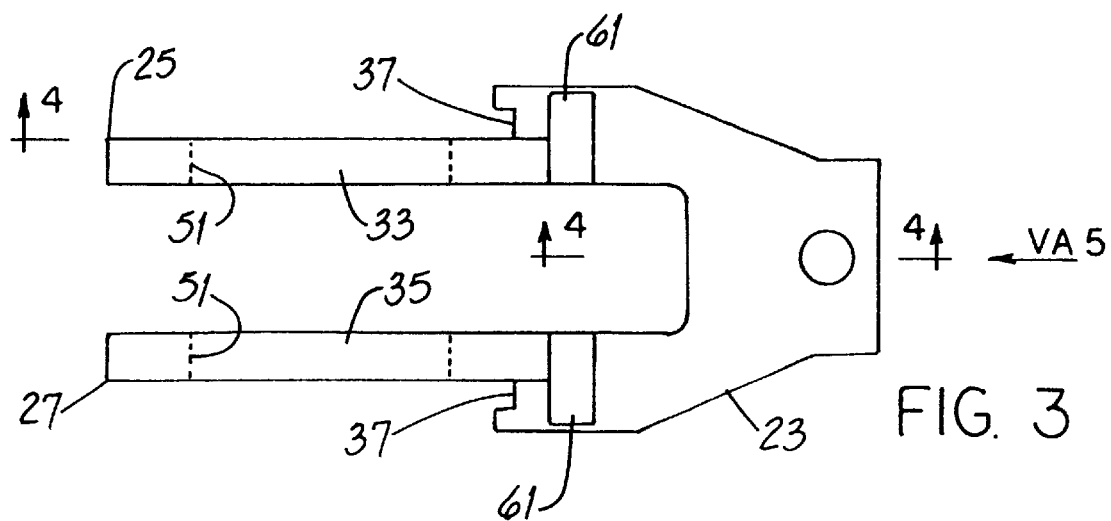
FIG. 3 is a top plan view of a component, the attachment member, of the new mechanism.
Figure 4:
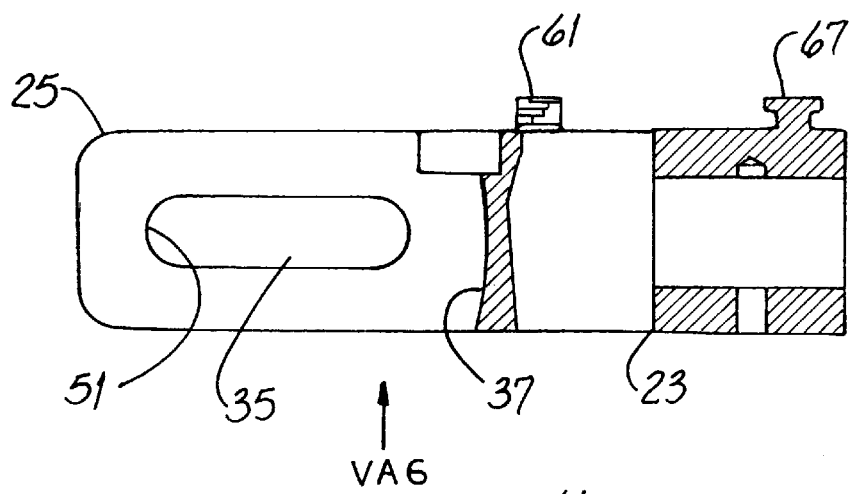
FIG. 4 is a sectioned elevation view of the attachment member of FIG. 3 taken along the section planes 4—4 of FIG. 3.
Figure 5:
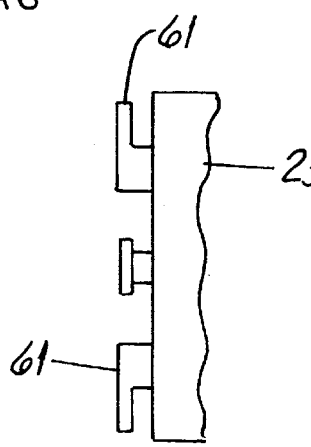
FIG. 5 is a view of the attachment member of FIG. 3 taken along the viewing axis VA5 thereof. Parts are broken away.
Figure 7:
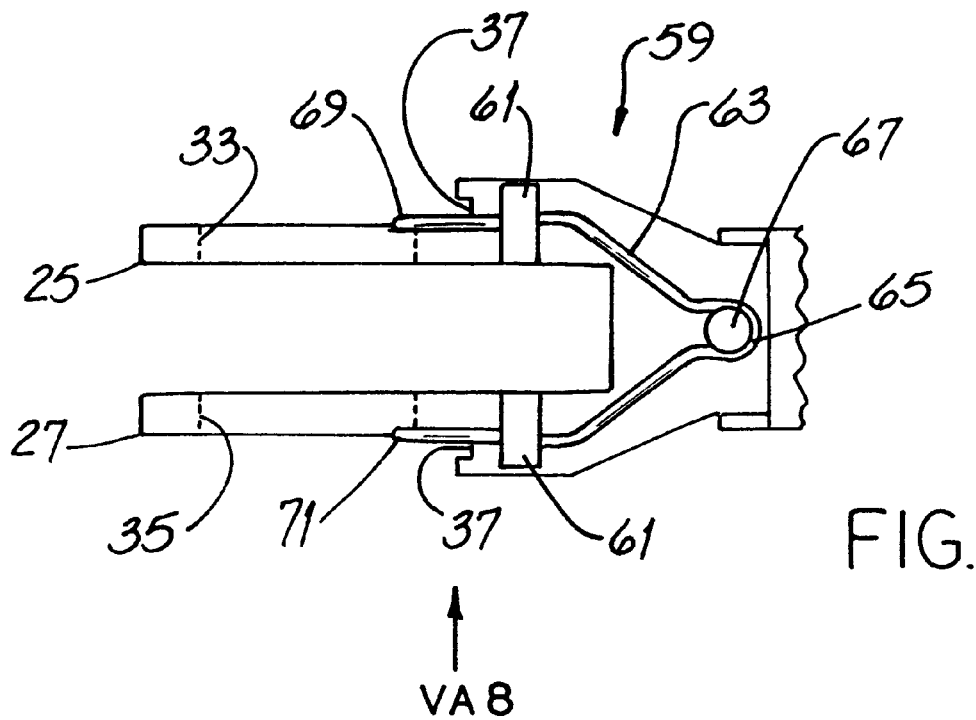
FIG. 7 is a top plan view of the attachment member of FIG. 3 shown in conjunction with yet another component of the new mechanism, a wire bail.
Figure 8:
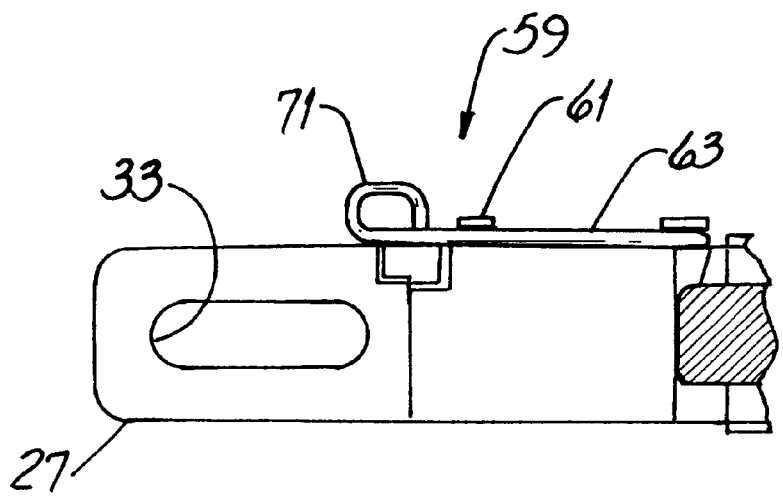
FIG. 8 is a side elevation view of the structure shown in FIG. 7 taken along the viewing axis VA8 thereof. Parts are in section and other parts are broken away.
Figure 9:
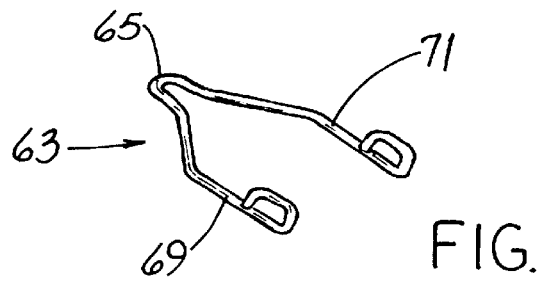
FIG. 9 is a perspective view of the wire bail shown in FIG. 7.

Because the new mechanism 10 is primarily used in conjunction with an implement attached to a tractor by a 3-point hitch 11, it will be helpful to have an understanding of some aspects of such a hitch 11. Referring to FIGS. 1 and 2, a 3-point hitch 11 is mounted to the rear of a tractor and has a pair of laterally-spaced draft arms 13, each having an aperture 15 for coupling the arm and an implement to one another. The hitch 11 also has an upper arm 17 horizontally centered between the arms 13 and having an aperture 19 for coupling the arm 17 and the implement to one another.

When the arms 13, 17 and the implement are coupled to one another, the vertical position of the implement changes as the arms 13, 17 move upwardly or downwardly. Up-and-down movement of the draft arms 13 is by a separate hydraulic cylinder 21.

When the cylinders 21 are extended or retracted, the draft arms 13 (and the implement attached thereto) raise or lower. Unless the tractor is fitted with mechanisms like mechanism 10 described below, the vertical height of the implement can be changed only by actuating the hydraulic cylinders 21. In other words, the implement is not permitted to float.

Referring also to FIGS. 3 through 13, the mechanism 10 includes a clevis-like, generally Y-shaped attachment member 23 formed of opposed, spaced-apart first and second arms 25, 27, respectively, that are substantially identical in size and shape and that are mounted in "mirror-image" fashion. Each arm 25, 27 is flat, generally rectangular, generally parallel to the other arm 27, 25 and generally parallel to the long axis 29 of the lift link 31. The spacing between the arms 25, 27 is selected to receive a respective one of the two draft arms 13 therebetween with slight clearance.

Referring particularly to FIGS. 3, 4, 7 and 8, the arms 25, 27, each have a separate elongate slot 33, 35 formed therein and elsewhere in this specification, the slots 33, 35 are referred to as first and second slots 33, 35, respectively. The slots 33, 35 are also generally parallel to the link long axis 29. And in a highly preferred embodiment, each arm 25, 27 has a contoured surface 37 formed on it and the purpose of such surfaces 37 is described below.

A pivot-mounted selection member 39 has a pin 41 and first and second spaced-apart, parallel plates 43, 45, respectively, affixed to the pin 41 by respective bolts 47 through one of the plates 43, 45 and threaded into the pin 41. The pin 41 is extended through the slots 33, 35 with the plates 43, 45 positioned exteriorly to the arms 25, 27, respectively; that is, the arms 25, 27, are between the plates 43, 45. And when the mechanism 10 and a draft arm 13 are attached to one another, the draft arm 13 is between the arms 25, 27 of the attachment member 23. (Attachment of the mechanism 10 and a draft arm 13 to one another is by removing a bolt 47 holding one of the plates 43 or 45 to the pin 41, placing the attachment member 23 so that its arms 25, 27 straddle the draft arm 13, inserting the pin 41 through an arm 25, the arm 13, and the other arm 27 and re-attaching the plate 43 or 45 to the pin 41 by threading the bolt 47 into the pin 41.)

Most preferably, each plate 43, 45 of the selection member 39 has a proximal end 49, the shape of which conforms to the shape of the contoured surface 37 on that arm 25 or 27 immediately adjacent to the plate 43 or 45. In a specific embodiment, the proximal ends 49 of the plates 43 45 are shaped substantially identically to one another as are the contoured surfaces 37 formed on the arms 25, 27.

Figure 12:
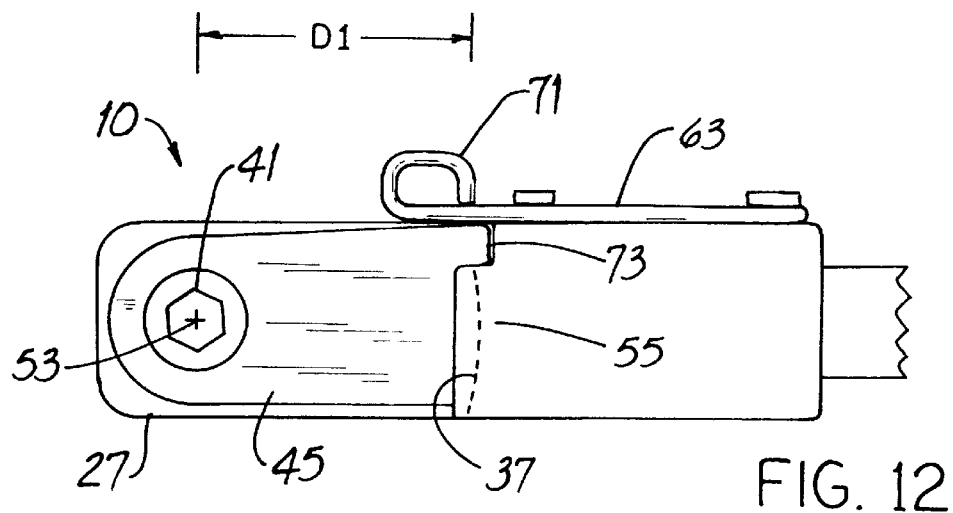
FIG. 12 is a side elevation view of the new mechanism in the "no-float" position. Parts are broken away.

When the selection member 39 is set in its first or no-float position as shown in FIG. 12, the proximal end 49 of each plate 43, 45 engages a respective contoured surface 37 on the attachment member 23. When the selection member 39 is so positioned, its plates 43, 45 constitute, in effect, rigid extensions of the lift links 31. As a consequence, the pin 41 is held at the distal ends 51 of the slots 33, 35 and prevented from moving along the slots 33, 35. Therefore, the draft arms 13 (through which the respective pins 41 also extend) are prevented from moving up and down with respect to the lift link 31.

Figure 13:
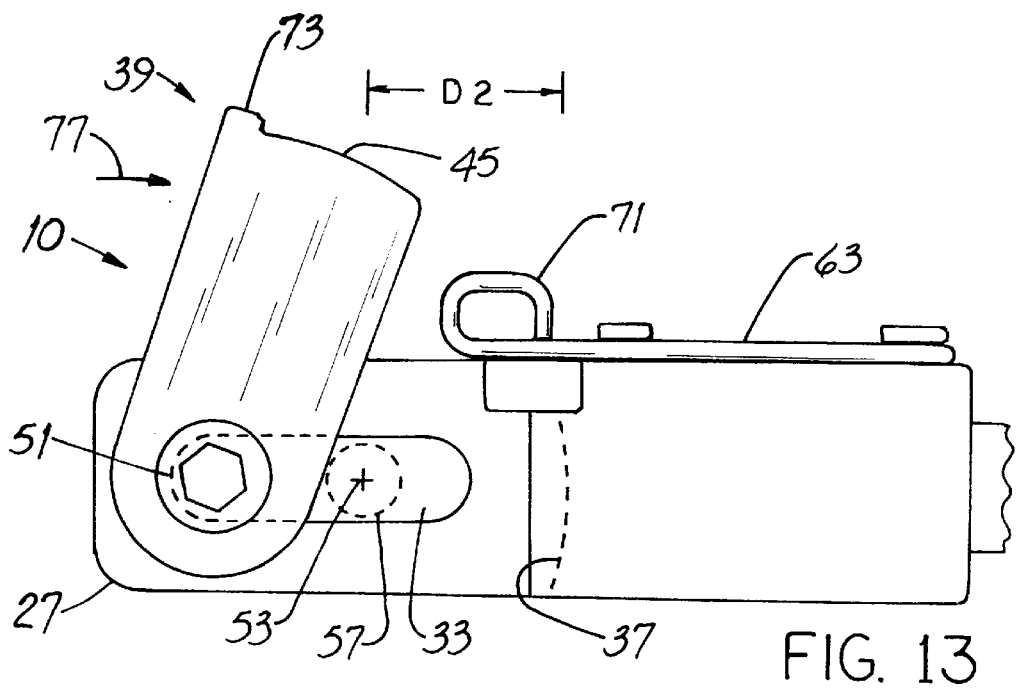
FIG. 13 is a side elevation view of the new mechanism in the "float" position. Parts are broken away and surfaces of parts are shown in dashed outline.

Referring particularly to FIG. 13, when the selection member 39 is in the second or float position, its plates 43, 45 are away from the contoured surfaces 37 of the attachment member 23 and, specifically, the plate proximal ends 49 are out of contact with the respective contoured surfaces 37 of the arms 25, 27 of such attachment member 23. The pin 41, no longer held at the slot distal ends 51 by the selection member 39, is then free to move along the slots 33, 35. Such movement will occur when the implement attached to the draft arms 13 encounters a bump or depression and urges the draft arms 13 up or down.

And the new mechanism 10 also has other aspects described below. Referring particularly to FIGS. 6, 12 and 13, the pin 41 that secures the mechanism 10 and a draft arm 13 to one another is generally cylindrical and has a long axis 53. In its first or no-float position, shown in FIG. 12, the selection member 39 engages the attachment member 23 at a location 55 spaced from the long axis 53 by a first dimension D1. When the contoured surfaces 37 define arcs of a circle, (as they do in the preferred embodiment) the first dimension D1 is substantially equal to the radius of curvature of such surfaces 37.

When the selection member 39 is pivoted to its second or float position, as shown in FIG. 13 the pin 41 is free to move away from the slot distal ends 51 as e.g., to the location 57 at which the position of the pin 41 is represented in dashed outline. When the pin 41 is so positioned, the engagement location 55 and the long axis 53, are spaced apart by a second dimension D2 which is less than the first dimension D1.

As earlier noted, agricultural implements and the tractors which tow them are subject to a good deal of rough use. Referring particularly to FIGS. 1, 3, 4, 5, 7, 8, 9, 12 and 13, a highly preferred embodiment of the mechanism 10 also includes a retention structure 59 for retaining the selection member 39 in its first or second position, as the case may be. A part of such structure 59 comprises ear-like tangs 61 affixed to and extending laterally from the attachment member 23, i.e., extending away from the axis 29.

Another part of such structure 59 involves a looped wire bail 63, the center portion 65 of which is secured to a headed stud 67 affixed to and extending away from the attachment member 23. Extending from such center portion 65 are first and second resilient retaining devices 69, 71, respectively. Absent the mirror-image-mounted tangs 61 on the attachment member 23, the retaining devices 69, 71 would be closer to one another by virtue of the way the bail 63 is formed. Each tang 61 positions a respective retaining device 69, 71 so that such device 69, 71 is in registry with and, in the no-float position, overlaps a respective plate 43 or 45 and the finger 73 on each such plate 43, 45.

Figure 14:
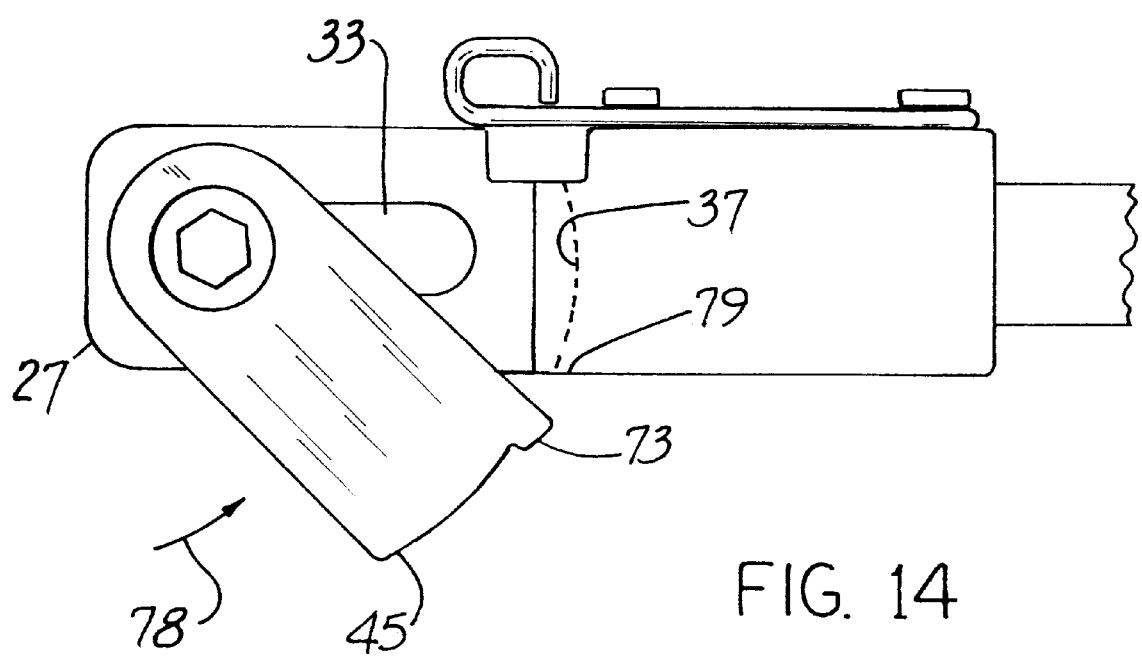
FIG. 14 is another side elevation view of the new mechanism in the "float" position. Parts are broken away and surfaces of parts are shown in dashed outline.

To put it in other words, when the plates 43, 45 are in the first position shown in FIG. 12, each plate 43, 45 and each finger 73 is between its respective retaining device 69 or 71 and the attachment member 23. When the plates 43, 45 are in the second or float position, as shown in FIGS. 13 and 14, the plates 43, 45 and fingers 73 are out of engagement with and away from their respective retaining devices 69, 71. And as shown in FIG. 13, each such device 69, 71 holds its respective plate 43, 45 away from the respective contoured surface 37 on the attachment member 23. When the plates 43, 45 are in such second position, the retaining devices 69, 71 are between the respective plates 43, 45 and fingers 73 and the attachment member 23.

Thus, the devices 69, 71 prevent the plates 43, 45 from swinging in the direction of arrow 77 into engagement with the surfaces 37. And as shown in FIG. 14, any tendency of the plates 43, 45 to swing in the direction of the arrow 78 into engagement with the surfaces 37 is prevented. The fingers 73 would strike the attachment member 23 at the location 79 and block further motion of the plates 43, 45 in such direction.

From the foregoing, it will now be appreciated that when the selection member 39 is in its first or no-float position, it coacts with the attachment member 23 in such a way that the pin 41 is unable to move from the distal ends 51 of the slots 33, 35. This configuration fixes the overall center-to-center length of the lift link 31. On the other hand, when the plates 43, 45 of the selection member 39 are out of engagement with the attachment member 23, the pin 41 is not restrained from moving along the slots 33, 35 and the overall center-to-center length of the lift link 31 varies as the implement is towed over the ground.

It will also be appreciated that the new mechanism 10 has only a few parts. And it is particularly noteworthy that each retaining device 69, 71 can be urged laterally (laterally to a viewer of FIG. 7) out of registry with its respective plate 43, 45 so that the selection member 39 can be pivoted to the float or no-float position without the use of tools.

While the principles of the invention have been shown and described in connection with a few preferred embodiments, it is to be understood clearly that such embodiments are by way of example and are not limiting.

What is claimed:

1. In an implement-positioning apparatus including a draft arm, a lift link extending along an axis, and a mechanism coupling the arm and the link together for selectively permitting the floating arm movement relative to the link, the improvement wherein the mechanism includes:

an attachment member fixed with respect to the link and including at least one elongate slot extending thereal-ong;

an elongate selection member coupled to the attachment member by a pin through the slot and movable between a first position substantially parallel to the attachment member and a second position angular to the attachment member and a retention structure for maintaining the selection member in one of the positions, the retention structure including a resilient device connectable to the attachment member.

2. The apparatus of claim 1 wherein the selection member is substantially parallel to the slot when the selection member is in the first position.

3. The apparatus of claim 1 wherein:

the pin has a long axis;

in the first position, the selection member engages the attachment member at a location and the location and the long axis are spaced apart by a first dimension; and when the pin is away from the distal end, the location and the long axis are spaced apart by a second dimension which is less than the first dimension.

4. The apparatus of claim 3 wherein the attachment member has a contoured surface engaged by the selection member.

5. The apparatus of claim 1 wherein:

the lift link extends along an axis;

the attachment member includes elongate first and second arms substantially parallel to the axis;

the slot is a first slot in the first arm and the second arm includes a second elongate slot extending therealong substantially parallel to the axis; and the selection member includes first and second plates coupled to one another by a pin through the slots.

6. In an implement-positioning apparatus including a draft arm, a lift link extending along an axis, and a mechanism coupling the arm and the link together for selectively permitting the floating arm movement relative to the link, the improvement wherein the mechanism includes:

an attachment member fixed with respect to the link and including at least one elongate slot extending therealong; and an elongate selection member coupled to the attachment member and to the slot by a pin through the slot and movable between a first position substantially parallel to the attachment member and to the slot and a second position angular to the attachment member, the selection member including first and second plates; and a retention structure for securing the selection member in the first position, the retention structure including:

first and second resilient retaining devices engaging the first and second plates, respectively.

7. The apparatus of claim 6 wherein each plate includes a protruding finger and wherein:

when the plates are in the first position, the fingers are between their respective retaining devices and the attachment member.

8. The apparatus of claim 7 wherein:

when the plates are in the second position, the retaining devices are between their respective fingers and the attachment member.

9. The apparatus of claim 7 wherein:

the pin has a long axis;

in the first position, the selection member engages the attachment member at a location and the location and the long axis are spaced apart by a first dimension; and when the pin is away from the distal end, the location and the long axis are spaced apart by a second dimension which is less than the first dimension.

10. The apparatus of claim 6 wherein:

when the plates are in the second position, the retaining devices are between their respective plates and the attachment member.

11. In an implement-positioning apparatus including a draft arm, a lift link extending along an axis, and a mechanism coupling the arm and the link together for selectively permitting the floating arm movement relative to the link, the improvement wherein the mechanism includes:

an attachment member fixed with respect to the link and including at least one elongate slot extending therealong; and an elongate selection member coupled to the attachment member by a pin through the slot and movable between a first position substantially parallel to the attachment member and a second position angular to the attachment member;

wherein:

the pin has a long axis;

in the first position, the selection member engages the attachment member at a location and the location and the long axis are spaced apart by a first dimension;

when the pin is away from the distal end, the location and the long axis are spaced apart by a second dimension which is less than the first dimension; and wherein:

the attachment member has a contoured surface engaged by the selection member, the contoured surface has a radius of curvature; and wherein:

in the first position, the long axis is spaced from the contoured surface of the radius.

12. The apparatus of claim 11 wherein the selection member has a proximal end shaped like the contoured surface.

13. In an implement-positioning apparatus including a draft arm, a lift link extending along an axis, and a mechanism coupling the arm and the link together for selectively permitting the floating arm movement relative to the link, the improvement wherein the mechanism includes:

an attachment member fixed with respect to the link and including at least one elongate slot extending therealong; and an elongate selection member coupled to the attachment member by a pin through the slot and movable between a first position substantially parallel to the attachment member and a second position angular to the attachment member;

wherein:

the lift link extends along an axis;

the attachment member includes elongate first and second arms substantially parallel to the axis;

the slot is a first slot in the first arm and the second arm includes a second elongate slot extending therealong substantially parallel to the axis; and the selection member includes first and second plates coupled to one another by a pin through the slots; and wherein the apparatus further includes first and second resilient retaining devices fixed with respect to the attachment member arms and positioned to retain the plates in the first position.

* * * * *